Nov. 8, 1932.  H. G. WEYMOUTH ET AL  1,886,996

FLUID METER

Filed Jan. 24, 1928   2 Sheets-Sheet 1

Inventors
Harry G. Weymouth
Earle M. Kreidler
William A. Strauch
Attorney

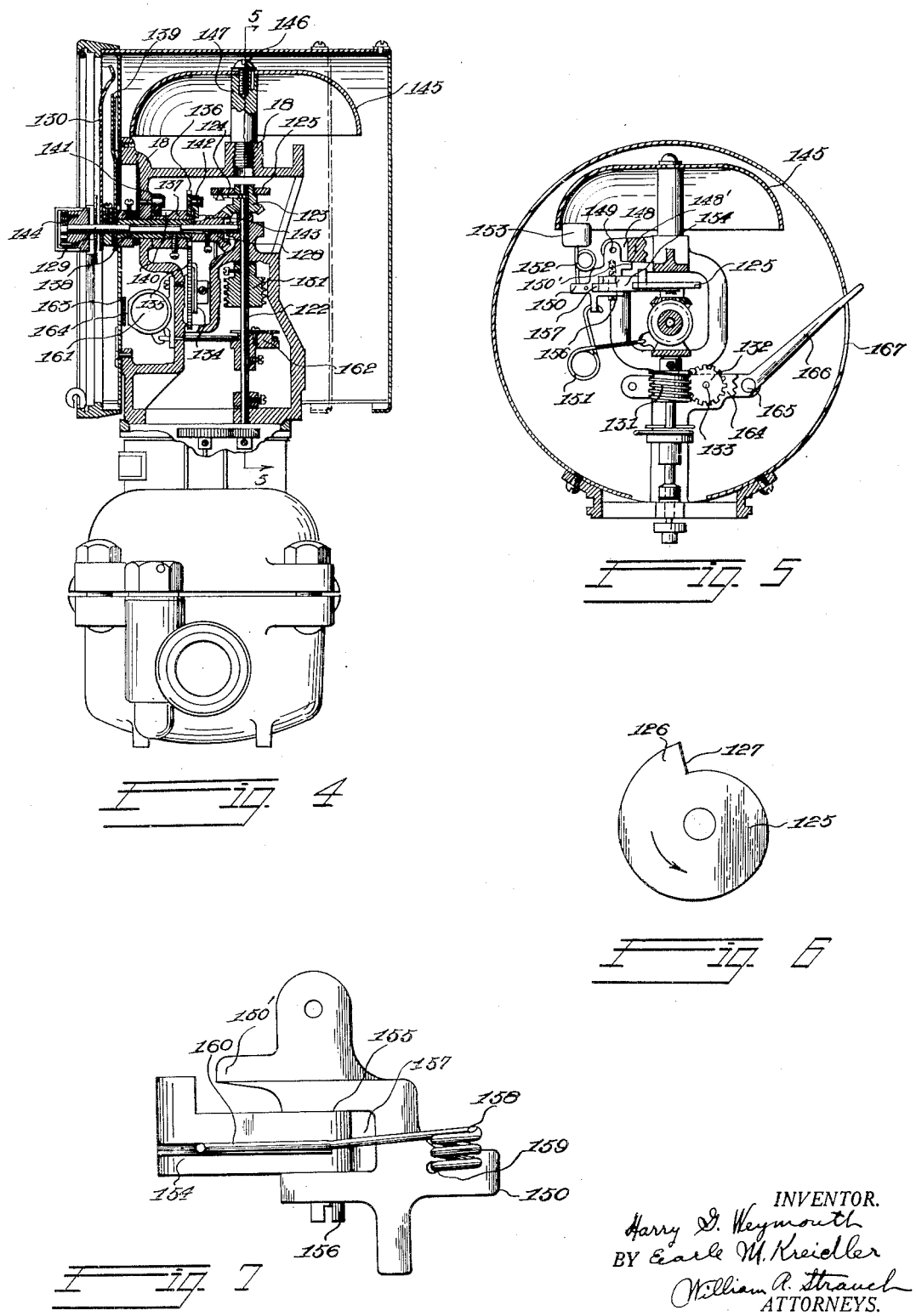

Patented Nov. 8, 1932

1,886,996

UNITED STATES PATENT OFFICE

HARRY G. WEYMOUTH, OF PITTSBURGH, AND EARL M. KREIDLER, OF WILKINSBURG, PENNSYLVANIA, ASSIGNORS TO PITTSBURGH EQUITABLE METER COMPANY, OF PITTSBURGH, PENNSYLVANIA

FLUID METER

Application filed January 24, 1928. Serial No. 249,062.

This invention relates to a register for a fluid meter especially designed for use in connection with the dispensing of gasoline, though the invention is obviously capable of other uses.

A primary object of the invention is to provide a fluid meter having a register of simple construction for use in dispensing fluid, the operation of which is visibly and audibly indicated so that the purchaser of the metered fluid may be advised of the quantity that is passing through the meter.

Another object of the invention is to provide a fluid meter having a plurality of visible indicators that is extremely simple in construction, in which the parts are compactly arranged and in which the indicators are independently driven from a shaft the movements of which are controlled by a meter.

A still further object of the invention is to provide a fluid register including an indicator moving over a dial that traverses a complete revolution for each unit of fluid metered and that includes another indicator that simultaneously moves over the same dial through only a portion of a revolution for each unit of fluid that passes through the meter, which includes means whereby the indicators may be readily reset to their zero position.

A still further object of the invention is to provide a visible fluid meter indicator and register embodying a plurality of synchronously moving indicating and registering elements the operation of which is visible from a plurality of directions and in which novel means are provided whereby all of the indicators may be reset to their zero positions from either one of the plurality of mechanisms.

A still further object of the invention is to provide a meter having a plurality of pairs of indicators arranged so that the indicators of one pair move in synchronism with the indicators of the other pair.

A still further object of the invention is to provide a double face register having a simple arrangement for resetting the indicator hands from either face of the register.

Still further objects of the invention will appear as the description of the invention proceeds with reference to the accompanying drawings in which:

Figure 4 is a vertical sectional view of a modified form showing a single face register having the audible indicator mounted within the casing of the register.

Figure 5 is a sectional view taken on the plane indicated by the line 5—5 of Figure 4 looking in the direction of the arrows.

Figure 6 is a detailed view of the cam for operating the bell shown in Figures 4 and 5.

Figure 7 is a view of the clapper bracket taken in a direction opposite to that in which it appears in Figure 5.

Similar reference characters indicate like parts throughout the several figures.

Figures 1, 2:
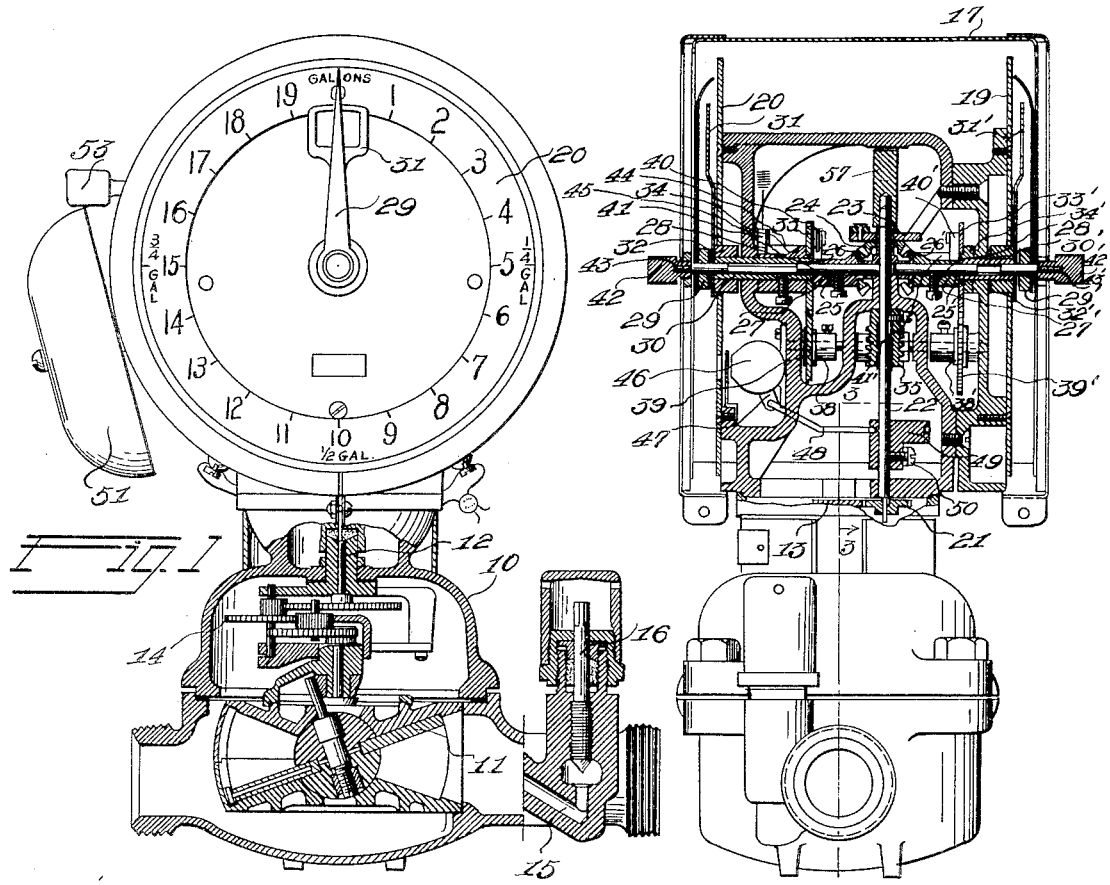
Figure 1 is an elevational view of a portion of the meter, the casing being removed to expose the operating parts thereof.
Figure 2 is an elevation, the registering and indicating mechanism being shown in transverse section.
Figure 3:
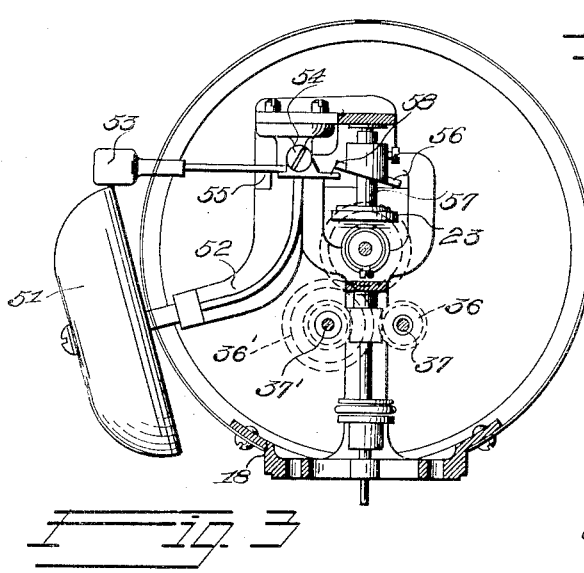
Figure 3 is a sectional view taken on the line indicated by 3—3 on Figure 2.

The improved visible and audible indicator and register of this invention is shown applied to a meter indicated generally by the numeral 10. In the embodiment of the invention disclosed, a meter including a nutating disc 11 is employed. The nutations of the disc 11 cause the rotation of a shaft 12 carrying a gear 13 (Figure 2). Suitable reduction gearing, indicated generally by the numeral 14 is used to secure a movement of gear 13 at a rate that is commensurate with the quantity of fluid that is passing through the meter. A by-pass 15 controlled by a valve 16 may be used to make minor adjustments in the quantity of fluid that is delivered for each unit of registration of the register and indicator. The parts so far described constitute no part of the present invention and it will be understood that other types of meters may be used in place of that just general described.

The improved visible and audible register and indicator includes a casing 17 that is attached to a suitable supporting bracket 18 projecting upwardly from and secured in any convenient manner to the meter casing.

Said casing serves to house the mechanism about to be described. Bracket 18 extends upwardly within the casing 17 and secured thereto in any suitable manner are a plurality of dials 19 and 20. Said dials face in opposite directions so that they may be viewed from opposite ends of the casing 17 to give a visual indication in a plurality of directions. The indicators about to be described move with reference to the stationary dials just referred to.

The gear 13, above referred to, meshes with a gear 21 that is fixed to the end of a shaft 22 suitably journaled in the supporting bracket 18. A friction drive 23 is arranged between a bevel gear 24 and a sleeve 57 on the shaft 22 and serves to frictionally drive said sleeve and gear as a unit with said shaft in one direction, but permitting reverse operation of said gear with respect to said shaft.

Suitably journaled in the bracket 18 are transverse shafts 25 and 25' extending in opposite directions from shaft 22. Rigidly mounted on shafts 25 and 25' are bevel gears 26 and 26' secured to sleeves 27 and 27' fixed with relation to said shafts by set screws 28. As shown on the drawings, bevel gears 26 and 26' mesh with the gear 24 above referred to and thus serve to transmit the movements of said gear to shafts 25 and 25'. Shafts 25 and 25' have secured to the ends thereof, unit indicators 29 and 29' that serve to move over the face of dials 19 and 20, preferably making one complete revolution for each unit of fluid passing through the meter.

Rotatably mounted on the shafts 25 and 25' adjacent the indicator just referred to are sleeves 30 and 30'. Sleeves 30 and 30' carry indicators 31 and 31' arranged to move over the dials 20 and 19, above referred to, collars 32 and 32' serving to connect the indicators rigidly to the sleeves just referred to. Spur gears 33 and 33' are secured to sleeves 30 and 30' respectively by hub members 34 and 34', and it is through these gears that the indicators 31 and 31' are caused to move. In order to transmit the motion of the shaft 22 to gears 33 and 33' just referred to, worm 35 is secured to shaft 22. Said worm meshes with worm wheels 36 and 36' secured to counter shafts 37 and 37' suitably journaled in the bracket 18. Secured to counter shafts 37 and 37' are friction drives 38 and 38' that serve to frictionally connect said shafts and gears 39 and 39' that mesh with the gears 33 and 33' before referred to.

In order to cause the gears 33 and 33' to move as a unit with shafts 25 and 25' when the indicator hands are being reset the gears 33 and 33' are provided with dogs 40 and 40' that engage teeth 41 and 41' respectively. The teeth are cut in the sleeves 27 and 27'. Said dogs permit free relative movement between the gears 33 and 33' and the sleeves 27 and 27', when the indicators are being driven by the meter. However, when the indicators are being reset, the dogs 40 and 40' engage the teeth 41 and 41' respectively and cause the indicators to move reversely as a unit. In order to conveniently reset the indicators, shafts 25 and 25' are provided with resetting handles 42 and 42' that are threaded upon reduced extensions 43 and 43' of said shafts. The threads on said extensions are so disposed that the resetting handles will be unthreaded from said extensions if they are turned in a direction other than that necessary to effect the setting of the indicator hands.

In order to stop the indicators in their zero position, the hub 34 or gear 33 is provided with a tooth 44 that engages a pivoted dog 45 suitably mounted on bracket 18 in position to engage said tooth when the indicators are in their zero positions and prevent their further reverse movement.

A totalizing register 46 suitably attached to the bracket 18 has an arm 47 connected by a link 48 to an eccentric 49 secured to shaft 22 by a set screw 50, the arrangement being such that for each rotation of said shaft the arm of the totalizing register will be operated once in well known manner.

In order to produce an audible signal whenever a unit quantity of fluid has passed through the meter, a bell 51 is mounted on an arm 52 projecting laterally from the bracket 18 through a suitable opening in the casing 17. A clapper 53 is pivotally mounted at 54 on a projection from bracket 18 and projects through a suitably formed slot in casing 17. A stop 55 on arm 52 limits the movement of the clapper in one direction. An inclined cam 56, that turns as a unit with a sleeve 57 that may be formed integrally with the sleeve upon which gear 24 is mounted, is frictionally driven by the friction drive 23. Said cam engages the end 58 of the clapper 53 once for each revolution of shaft 22 raising said clapper and releasing it when end 58 rides off the cam, which is interrupted in its peripheral extent to permit this to occur. The force of gravity causes the clapper 53 to then tap the bell 51.

In the operation of this form of the invention, the fluid passing through the meter actuates shaft 22 as above described. The movement of said shaft is transmitted through friction drive 23 gears 24, 26 and 26' to the shafts 25 and 25' said shafts causing the unit indicators 29 and 29' to make a complete revolution for each revolution of the shaft 22. At the same time, the worm 35 through friction drive 38 and 38', gears 39 and 39' and gears 33 and 33' causes the sleeves 30 and 30' and the indicators 31 and 31' carried thereby to show the movement of said shaft in greatly reduced ratio upon the face of dials 19 and 20. If desired, the gears may be so proportioned that the indicators 31 and 31' move one twentieth of a revolution for each complete revolution of the indicators 29 and 29'. As the sleeve 57 and the inclined cam 56 carried thereby, rotates as a unit with the shaft 22 when the meter is registering, cam 56 will engage the end 58 of clapper 53 and raise it against the action of gravity and subsequently release it once for each revolution of shaft 22. In this way, as above pointed out, audible indication is given that a unit quantity of fluid has passed through the meter.

When the desired quantity of fluid has been dispensed and it is desired to reset the indicators to their zero position, the operator grasps either the handle 42 or 42' and turns the shafts 25 and 25' in their reverse directions, said shafts being coupled together for rotation as a unit by means of gears 24, 26 and 26'. The friction of the drive 23 is insufficient to turn the parts of the meter backwards and accordingly, said drive does not rotate shaft 22 in the reverse direction. When the shafts 25 and 25' are moved in their reverse direction, the sleeves 30 and 30' and the indicators 31 and 31' carried thereby, are caused to return to their zero positions by virtue of the fact that the dogs 40 and 40' engage the teeth 41 and 41' on the hubs 27 and 27' of the gears 26 and 26' carried by shafts 25 and 25'. Reverse movement of sleeves 30 and 30' is permitted by the friction drives 38 and 38' which permit the gears 39 and 39' to rotate relatively to the counter shafts 37 and 37'. The indicators may thus be returned to zero position, the dog 45 engaging the tooth 44 when this position is reached, thus accurately positioning the parts for the next operation.

This invention has been above described for use in connection with the operation of a double face register and indicator. If it is desired to utilize a register having only a single face it will be understood by those skilled in the art that one set of the duplicate parts may be omitted.

A single face register of a type similar to the double face register and indicator above described, is illustrated in Figures 8 and 9 of the drawings. In this form of the invention, however, the audible indicator is positioned within the register casing. In these figures the numeral 122 indicates the meter driven shaft of the register and indicator. Said shaft has a bevel pinion or gear 123 secured to its upper end by means of a friction drive 124 so arranged that the gear 123 is carried as a unit with the shaft 122 when that shaft is rotated in one direction but permitting reverse rotation of the gear 123 with respect to said shaft when the indicator hands are being reset as above described. Fixed to the hub of the gear 123 is a cam 125 of the form shown in Figure 10. As indicated in said figure, the cam has a projection 126 formed to provide a relatively sharp shoulder 127 for a purpose presently to be described.

Bevel pinion 128 meshes with a bevel gear 128 secured to a unit indicator shaft 129 carrying the unit indicator 130 on the end thereof. A worm 131 is secured to the shaft 122 said worm meshing with the worm wheel 132 secured to a countershaft 133. Frictionally connected to the countershaft 133 by means of a friction drive 134 is a spur gear 135 that meshes with a gear 136 fixedly secured to a collar 137 that is itself secured to a sleeve 138 that carries the indicator hand 139 which moves only a fraction of a revolution for each complete revolution of the unit indicator hand 130. The collar 137 is provided with a single tooth 140 arranged in position to receive the end of the pawl 141 mounted on the frame 18, the tooth being disposed to receive said pawl when both indicator hands are in their zero positions.

The gear 136 carries a pawl 142 arranged to engage a single tooth 143 on the hub of the gear 128 when said gear is operated in its reverse direction in resetting the indicator hands. Such resetting is accomplished by means of resetting handle 144. The operation of the parts so far described is substantially the same as the operation of the substantially similar parts shown in the modification of the invention illustrated in Figures 1 and 2, in which figures similar parts are utilized in connection with a double face register, and accordingly a description of the operation of so much of the mechanism as has just been described is unnecessary.

In the modification shown in these figures the audible indicator in the form of a bell 145 is mounted within the casing of the register being secured by a screw 146 to a stud 147 suitably attached to the frame 18 in position above the operating mechanism of the register just described. Pivotally secured to a bifurcated projection 148 of the supporting frame 18 by means of a pin 149 is a bracket 150 shown in detail in Figure 11. The bifurcated projection 148 provides a stop shoulder 148' normally engaged by a stop arm 150' carried by bracket 150. Said bracket is biased toward the cam 125 by means of a spring 151 and carries upon a spring arm 152 the clapper 153 for the bell 145. Bracket 150 has a yielding arm 154 pivoted in a recess 155 in said bracket to swing in a plane parallel to the axis of pin 149. A pin 156 extending across said recess serves as a pivot for said arm 154 which is provided with a projection 157 (Figure 9) abutting against the rear wall of the recess 155 to limit the movement of said arm about the pin 156. A spring 158 has one end 159 thereof fixedly secured to the bracket 150 while the other end 160 thereof slidably engages a recess in the rear face of arm 154.

The operation of the parts just described is as follows. The cam 125 is rotated once for each rotation of the unit indicator hand. The arm 154 contacts with the periphery of said cam, said cam serving to swing the bracket on its pivot 149 when the cam moves in the direction of the arrow shown in Figure 10, and to abruptly release said bracket when the arm 154 rides over the shoulder 127 of the cam. At this time the clapper is caused to strike a blow against the bell in a manner that will be obvious. When the indicator hands are being reset to their zero positions the cam 125 is rotated in a direction reverse to that indicated by the arrow in Figure 10. The shoulder 127 of the cam engages the forward face of the yielding arm 154 viewing Figure 9, causing said arm to swing about the pin 156 in opposition to the spring 158 which permits said arm to yield to allow the shoulder 127 to clear said bracket without affecting the operation of the bell, since the arm 154 automatically springs to its normal position when the shoulder 127 has passed said arm in effecting the resetting of the indicator hands.

A totalizing register 161 operated by an eccentric 162 secured to the shaft 122 may also be provided. The reading of said totalizing register may be seen through an opening 163 in the dial. In order to hide the reading of the totalizing register from ordinary observation, a movable shutter 164 is provided (Figure 8) that may be moved into position across the opening 163 in the face of the dial. In order to control the movement of the shutter 164, it is preferably pivoted on a pin 165 suitably secured within the casing of the register and provided with an arm 166 that projects outwardly through a slot 167 slightly beyond the periphery of the casing.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range or equivalency of the claims are therefore intended to be embraced therein.

We claim:

1. In a register for liquids having a casing, a bracket therein, a substantially vertical drive shaft journaled in said bracket and driven by a liquid meter, an indicator shaft and an indicator carried thereby, and means to reset said indicator shaft and indicator, the combination with a cam mounted on said drive shaft having an abrupt shoulder, a pivoted clapper bracket having a clapper thereon, a bell adapted to be hit by said clapper, an arm pivoted in a recess in said clapper bracket, one end of said arm projecting beyond its pivot and engageable with a stop portion on said bracket, a spring biasing said arm against said stop portion, and a spring biasing said bracket against a stop, whereby during resetting of said indicator said arm is moved by said cam and said bracket remains stationary and the bell is not hit by said clapper.

2. In a register for liquids comprising a casing, a substantially vertical drive shaft therein, an indicator driven by said shaft, and means to reset said indicator, the combination with a cam having an abrupt shoulder mounted on said drive shaft, a clapper bracket pivoted about a substantially horizontal axis having a clapper thereon, an arm pivoted on said bracket about a substantially vertical axis, a spring biasing said arm in one direction against a stop on said bracket, a spring biasing said bracket toward said cam, and against a stop, and a bell adapted to be hit by said clapper, whereby when the indicator is reset the arm pivoted on said bracket moves against the bias of its spring and the bracket is not moved.

In testimony whereof we affix our signatures.

HARRY G. WEYMOUTH.
EARL M. KREIDLER.